(12) United States Patent
Sachimori et al.

(10) Patent No.: US 10,348,238 B2
(45) Date of Patent: Jul. 9, 2019

(54) DRIVE SYSTEM

(71) Applicant: TOYOTA JIDOSHA KABUSHIKI KAISHA, Toyota-shi, Aichi-ken (JP)

(72) Inventors: Yuta Sachimori, Toyota (JP); Chihiro Kameyama, Toyota (JP); Koji Kuraoka, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 15/937,173

(22) Filed: Mar. 27, 2018

(65) Prior Publication Data

US 2018/0302020 A1  Oct. 18, 2018

(30) Foreign Application Priority Data

Apr. 14, 2017  (JP) .................. 2017-080331

(51) Int. Cl.

| | |
|---|---|
| *B60W 10/08* | (2006.01) |
| *H02P 29/68* | (2016.01) |
| *H02P 27/06* | (2006.01) |
| *H02M 3/158* | (2006.01) |
| *H02M 7/5387* | (2007.01) |
| *H02M 1/00* | (2006.01) |
| *B60L 50/51* | (2019.01) |

(52) U.S. Cl.

CPC ............ *H02P 29/68* (2016.02); *H02P 27/06* (2013.01); *B60L 50/51* (2019.02); *B60L 2210/14* (2013.01); *B60L 2210/40* (2013.01); *B60L 2220/14* (2013.01); *H02M 3/158* (2013.01); *H02M 7/5387* (2013.01); *H02M 2001/007* (2013.01); *H02P 2201/09* (2013.01); *Y02T 10/7258* (2013.01)

(58) Field of Classification Search
None
See application file for complete search history.

(56) References Cited

U.S. PATENT DOCUMENTS

| | | | | |
|---|---|---|---|---|
| 6,952,355 B2* | 10/2005 | Riggio | ................ | H02M 1/4225 363/21.15 |
| 8,614,595 B2* | 12/2013 | Acatrinei | ............ | H02M 1/4208 327/172 |

(Continued)

FOREIGN PATENT DOCUMENTS

| | | |
|---|---|---|
| JP | 2009-100507 A | 5/2009 |
| JP | 2013-067227 A | 4/2013 |

*Primary Examiner* — Bentsu Ro
(74) *Attorney, Agent, or Firm* — Sughrue Mion, PLLC

(57) ABSTRACT

When the temperature detected by the temperature sensor is equal to or higher than a predetermined temperature, the drive system controls the boost converter and the inverter, such that the motor is driven in a range of an electric power on which a limit is imposed to decrease a discharge power upper limit value. When a failure occurs in the boost converter, the drive system stops the boost converter. When it is subsequently determined that the failure of the boost converter causes a failure of the temperature sensor, the drive system controls the inverter, such that the motor is driven without a limit imposed on the discharge power upper limit value, irrespective of the temperature detected by the temperature sensor that is equal to or higher than the predetermined temperature.

3 Claims, 3 Drawing Sheets

(56) References Cited

U.S. PATENT DOCUMENTS

| | | | |
|---|---|---|---|
| 2015/0108929 A1* | 4/2015 | Nobe | H02P 6/085 318/400.3 |
| 2015/0291053 A1* | 10/2015 | Sato | B60L 11/1872 307/10.1 |
| 2016/0152150 A1* | 6/2016 | Taguchi | B60L 11/1803 307/10.1 |
| 2018/0358886 A1* | 12/2018 | Patterson | H02M 3/158 |

* cited by examiner ved DRIVE SYSTEM

CROSS-REFERENCE TO RELATED APPLICATION

The present disclosure claims priority to Japanese Patent Application No. 2017-080331 filed on 14 Apr. 2017, which is incorporated herein by reference in its entirety including specification, drawings and claims.

TECHNICAL FIELD

The present disclosure relates to a drive system.

BACKGROUND

A proposed drive system includes a motor, an inverter configured to drive the motor, a battery, and a boost converter configured to step up an electric power of the battery and supply the stepped-up electric power to the inverter, and is configured to limit a discharge power of the battery when the temperature of the boost converter is equal to or higher than an allowable temperature (as described in, for example, JP 2013-67227A). This drive system sets the product of a reference value and a limiting factor as a discharge power upper limit value of the battery. When the temperature of the boost converter is lower than the allowable temperature, the limiting factor is set to 100%. When the temperature of the boost converter is equal to or higher than the allowable temperature, on the other hand, a value smaller than 100% is set to the limiting factor. This suppresses deterioration of dynamic characteristics, while suppressing overheat of the boost converter.

CITATION LIST

Patent Literature

PTL 1: JP 2013-067227A

SUMMARY

When a failure occurs in an element of the boost converter and causes a failure of an element configured to detect the temperature of the boost converter and the temperature of the boost converter is continuously detected as high temperature, however, the above proposed drive system significantly limits the discharge power upper limit value of the battery and is thereby likely to fail in driving the motor as needed.

A drive system of the present disclosure mainly aims to enable a motor to be driven as needed even on the occurrence of a failure in a boost converter.

In order to achieve the above main object, the drive system of the present disclosure is implemented by the following aspects.

The present disclosure is directed to a drive system. The drive system includes a motor, an inverter configured to drive the motor, a power storage device, a boost converter configured to step up an electric power on a power storage device side and supply the stepped-up electric power to an inverter side, a temperature sensor configured to detect a temperature of the boost converter and a control device configured to, when the temperature detected by the temperature sensor is lower than a predetermined temperature, control the boost converter and the inverter, such that the motor is driven in a range of a discharge power upper limit value according to a state of the power storage device, and when the temperature detected by the temperature sensor is equal to or higher than the predetermined temperature, control the boost converter and the inverter, such that the motor is driven in a range of an electric power on which a limit is imposed to decrease the discharge power upper limit value. When a failure occurs in the boost converter, the control device controls the boost converter and the inverter, such that the motor is driven at a stop of the boost converter, and when it is subsequently determined that the failure of the boost converter causes a failure of the temperature sensor, the control device controls the inverter, such that the motor is driven without a limit imposed on the discharge power upper limit value, irrespective of the temperature detected by the temperature sensor that is equal to or higher than the predetermined temperature.

When the temperature detected by the temperature sensor that is configured to detect the temperature of the boost converter is lower than the predetermined temperature, the drive system of this aspect controls the boost converter and the inverter, such that the motor is driven in the range of the discharge power upper limit value according to the state of the power storage device. When the temperature detected by the temperature sensor is equal to or higher than the predetermined temperature, the drive system of this aspect controls the boost converter and the inverter, such that the motor is driven in the range of the electric power on which the limit is imposed to decrease the discharge power upper limit value. When a failure occurs in the boost converter, the drive system controls the boost converter and the inverter, such that the motor is driven at a stop of the boost converter. When it is subsequently determined that the failure of the boost converter causes a failure of the temperature sensor that is configured to detect the temperature of the boost converter, the drive system controls the inverter, such that the motor is driven without the limit imposed on the discharge power upper limit value, irrespective of the temperature detected by the temperature sensor that is equal to or higher than the predetermined temperature. This configuration enables the motor to be driven within the range of the discharge power upper limit value of the power storage device, even when the temperature detected by the temperature sensor that is determined to have a failure, is equal to or higher than the predetermined temperature. This accordingly enables the motor to be driven as needed even on the occurrence of a failure in the boost converter.

DESCRIPTION OF EMBODIMENTS

Figure 1:
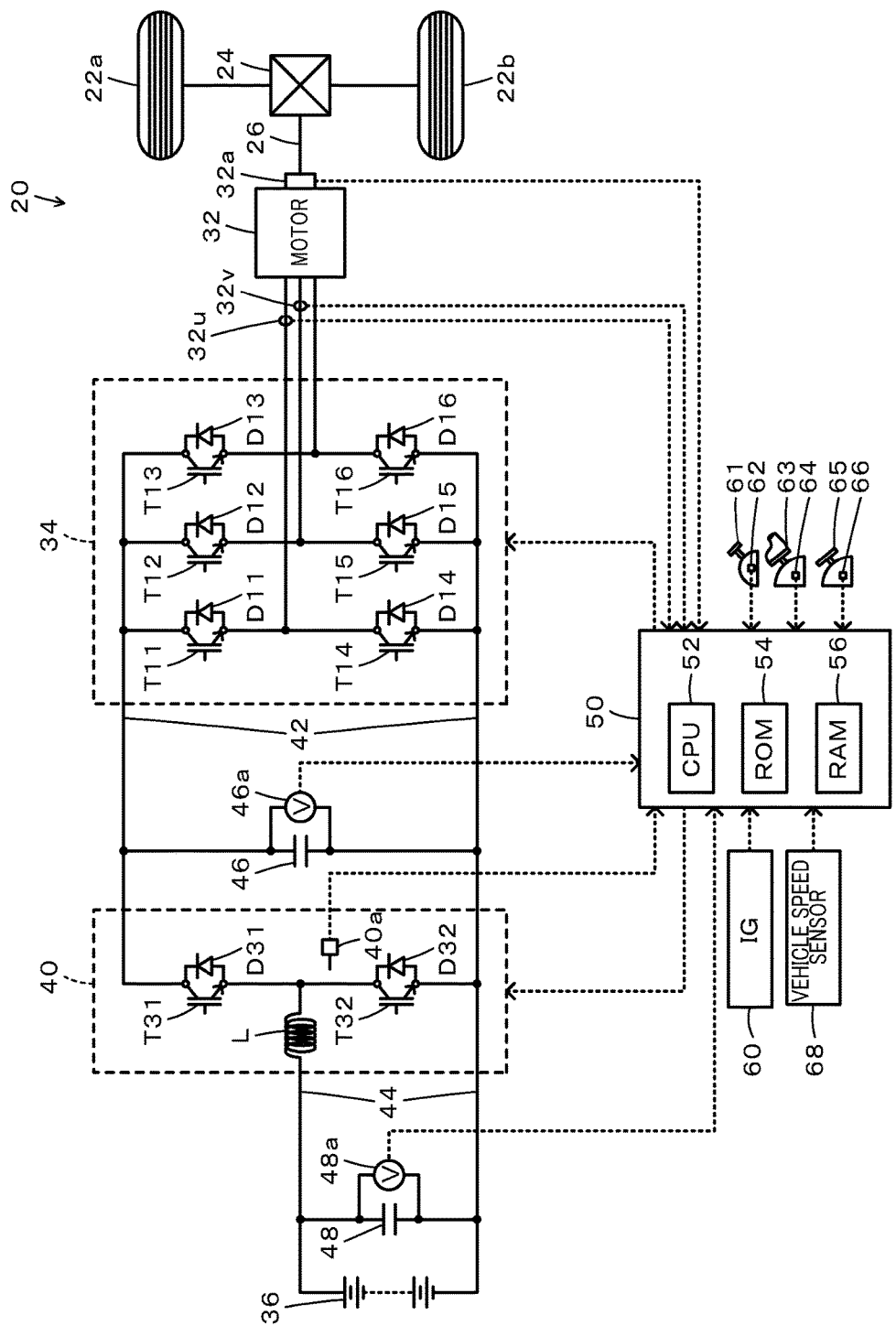
FIG. 1 is a configuration diagram illustrating the schematic configuration of an electric vehicle equipped with a drive system according to an embodiment of the present disclosure.

The following describes aspects of the disclosure with reference to some embodiments. FIG. 1 is a configuration diagram illustrating the schematic configuration of an electric vehicle 20 equipped with a drive system according to an embodiment of the present disclosure. As illustrated, the electric vehicle 20 of the embodiment includes a motor 32, an inverter 34, a battery 36, a boost converter 40 and an electronic control unit 50.

The motor 32 is configured as a synchronous motor generator having a rotor with permanent magnets embedded therein and a stator with three-phase coils wound thereon. The rotor of this motor 32 is connected with a driveshaft 26 that is coupled with drive wheels 22a and 22b via a differential gear 24.

The inverter 34 is used to drive the motor 32. This inverter 34 is connected with the boost converter 40 via high voltage-side power lines 42 and includes six transistors T11 to T16 and six diodes D11 to D16 that are respectively connected in parallel to the six transistors T11 to T16. The transistors T11 to T16 are arranged in pairs, such that two transistors in each pair respectively serve as a source and a sink relative to a positive electrode line and a negative electrode line of the high voltage-side power lines 42. The respective phases of the three-phase coils (U phase, V phase and W phase) of the motor 32 are connected with connection points of the respective pairs of the transistors T11 to T16. When a voltage is applied to the inverter 34, the electronic control unit 50 serves to regulate the rates of ON times of the respective pairs of the transistors T11 to T16, such as to provide a rotating magnetic field in the three-phase coils and thereby rotate and drive the motor 32. A capacitor 46 for smoothing is mounted to the positive electrode line and the negative electrode line of the high voltage-side power lines 42.

The battery 36 is configured as, for example, a lithium ion rechargeable battery or a nickel metal hydride battery and is connected with the boost converter 40 via low voltage-side power lines 44. A capacitor 48 for smoothing is mounted to a positive electrode line and a negative electrode line of the low voltage-side power lines 44.

The boost converter 40 is connected with the high voltage-side power lines 42 and with the low voltage-side power lines 44 and includes two transistors T31 and T32, two diodes D31 and D32 that are respectively connected in parallel to the two transistors T31 and T32, and a reactor L. The transistor T31 is connected with the positive electrode line of the high voltage-side power lines 42. The transistor T32 is connected with the transistor T31 and with the negative electrode lines of the high voltage-side power lines 42 and the low voltage-side power lines 44. The reactor L is connected with a connection point of the transistors T31 and T32 and with the positive electrode line of the low voltage-side power lines 44. The electronic control unit 50 regulates the rate of ON time of the transistors T31 and T32. In response to this regulation, the boost converter 40 steps up an electric power of the low voltage-side power lines 44 and supplies the stepped-up electric power to the high voltage-side power lines 42, while stepping down an electric power of the high voltage-side power lines 42 and supplying the stepped-down electric power to the low voltage-side power lines 44.

The electronic control unit 50 is configured as a CPU 52-based microprocessor and includes a ROM 54 configured to store processing programs, a RAM 56 configured to temporarily store data, and input/output ports, in addition to the CPU 52. Signals from various sensors are input into the electronic control unit 50 via the input port. The signals input into the electronic control unit 50 include, for example, a rotational position $\theta$m from a rotational position detection sensor 32a (for example, resolver) configured to detect the rotational position of the rotor of the motor 32, and phase currents Iu and Iv from current sensors 32u and 32v configured to detect electric currents flowing in the respective phases of the motor 32. The input signals also include a voltage Vb from a voltage sensor (not shown) mounted between terminals of the battery 36 and an electric current Ib from a current sensor (not shown) mounted to an output terminal of the battery 36. The input signals further include a converter temperature Tc from a temperature sensor 40a mounted to the boost converter 40, a voltage VH of the capacitor 46 (high voltage-side power lines 42) from a voltage sensor 46a mounted between terminals of the capacitor 46 and a voltage VL of the capacitor 48 (low voltage-side power lines 44) from a voltage sensor 48a mounted between terminals of the capacitor 48. The input signals additionally include an ignition signal from an ignition switch 60 and a shift position SP from a shift position sensor 62 configured to detect an operating position of a shift lever 61. Furthermore, the input signals include an accelerator position Acc from an accelerator pedal position sensor 64 configured to detect a depression amount of an accelerator pedal 63, a brake pedal position BP from a brake pedal position sensor 66 configured to detect a depression amount of a brake pedal 65, and a vehicle speed V from a vehicle speed sensor 68. Various control signals are output from the electronic control unit 50 via the output port. The signals output from the electronic control unit 50 include, for example, switching control signals to the transistors T11 to T16 included in the inverter 34 and switching control signals to the transistors T31 and T32 included in the boost converter 40. The electronic control unit 50 calculates an electrical angle $\theta$e and a rotation speed Nm of the motor 32, based on the rotational position $\theta$m of the rotor of the motor 32 input from the rotational position detection sensor 32a. The electronic control unit 50 also calculates a state of charge SOC of the battery 36, based on an integrated value of the electric current Ib of the battery 36 input from the current sensor (not shown). The state of charge SOC herein denotes a ratio of the capacity of electric power dischargeable from the battery 36 to the overall capacity of the battery 36. The electronic control unit 50 also calculates an input limit Win and an output limit Wout of the battery 36, based on the calculated state of charge SOC and a battery temperature input from a temperature sensor (not shown) mounted to the battery 36. The input limit Win herein denotes a maximum charge power to charge the battery 36, and the output limit Wout herein denotes a maximum discharge power to be dischargeable from the battery 36.

In the electric vehicle 20 of the above configuration, the electronic control unit 50 performs drive control described below. The drive control sets a required torque Td* that is required for the driveshaft 26, based on the accelerator position Acc and the vehicle speed V, and sets a driving required power Pd* by multiplying the set required torque Td* by the rotation speed Nm of the motor 32. The drive control also sets an execution power P* by limiting the driving required power Pd* with charge and discharge power upper limit values Winlim and Woutlim that are obtained by multiplying the input limit Win and the output limit Wout of the battery 36 respectively by limiting factors kin and kout, and sets an execution torque T* by dividing the execution power P* by the rotation speed Nm of the motor 32. The limiting factor kin herein denotes a coefficient used to limit the input limit Win and is set in a range of value 0 to value 1. The limiting factor kout herein denotes a coefficient used to limit the output limit Wout and is set in a range of value 0 to value 1. The drive control subsequently sets the set execution torque T* to a torque command Tm* of the motor 32 and performs switching control of the transistors T11 to T16 included in the inverter 34, such as to drive the motor 32 with the torque command Tm*. The drive control also sets a target voltage VH* of the high voltage-side power lines 42, such as to drive the motor 32 with the torque command Tm*, and performs switching control of the transistors T31 and T32 included in the boost converter 40, such as to make the voltage VH of the high voltage-side power lines 42 equal to the target voltage VH*.

Figure 2:
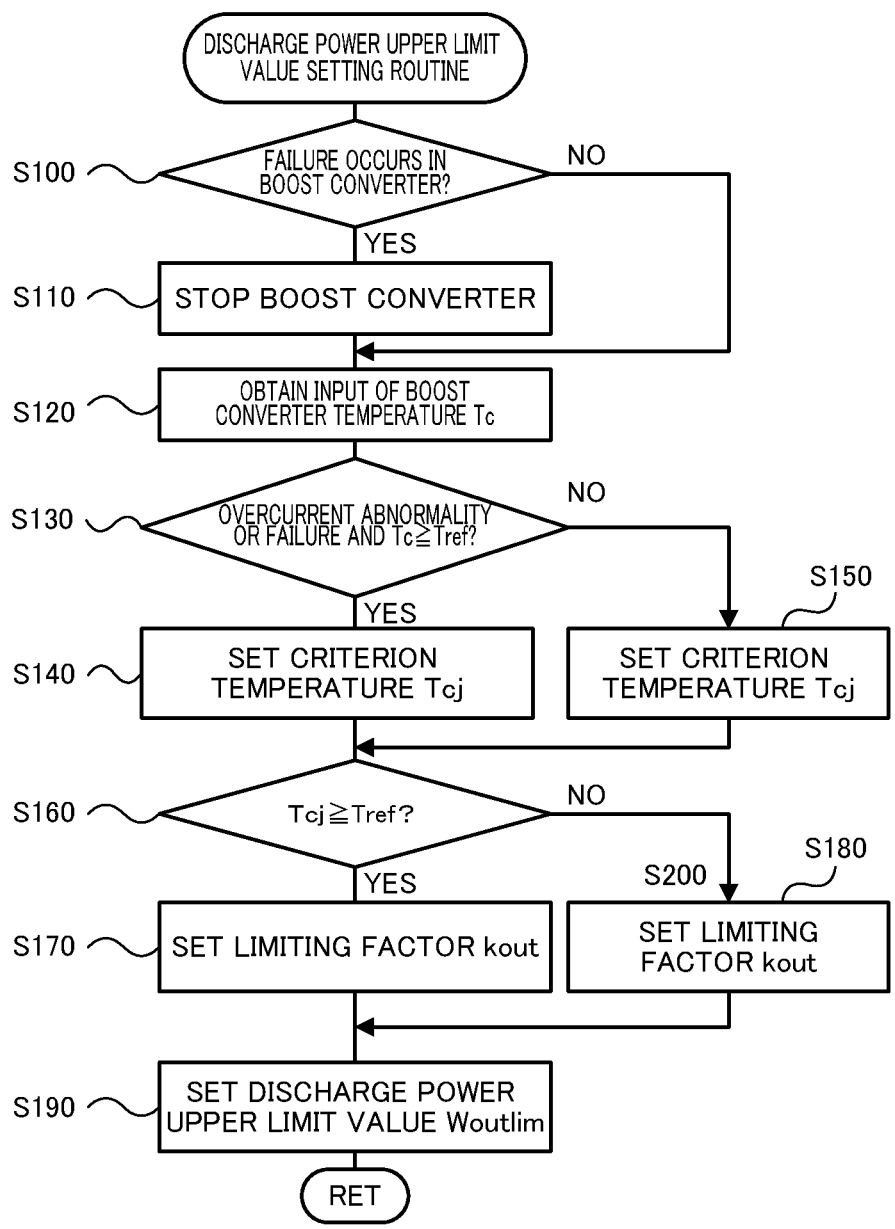
FIG. 2 is a flowchart showing a discharge power upper limit value setting routine performed by an electronic control unit according to the embodiment.

The following describes the operations of the electric vehicle 20 of the embodiment having the above configuration or more specifically a series of operations on the occurrence of a failure in the boost converter 40. FIG. 2 is a flowchart showing one example of a discharge power upper limit value setting routine performed by the electronic control unit 50 according to the embodiment. This routine is performed repeatedly.

When the discharge power upper limit value setting routine is triggered, the CPU 52 of the electronic control unit 50 first determines whether a failure occurs in the boost converter 40 (step S100). When it is determined that a failure occurs in the boost converter 40, the CPU 52 stops the boost converter 40 (i.e., gate blocking) (step S110). The determination of whether a failure occurs in the boost converter 40 may be performed by reading the value (result) at a predetermined address in the RAM 56 that stores results of a failure diagnosis process (not shown) (results showing the occurrence or non-occurrence of failures). A failure of the boost converter 40 may be, for example, a failure caused by an overcurrent abnormality that overcurrent flows in the boost converter 40, a failure caused by an overvoltage abnormality that an overvoltage is applied to the boost converter 40, or a failure caused by a switching abnormality of the transistors T31 and T32 of the boost converter 40. Even when the boost converter 40 is at stop (i.e., in the gate blocking state), the electric power from the battery 36 can be supplied to the inverter 34 without stepping up the voltage by the boost converter 40, so that the motor 32 can be driven.

The CPU 52 subsequently obtains input of the temperature Tc of the boost converter 40 (hereinafter referred to as converter temperature Tc) from the temperature sensor 40a (step S120) and determines whether the temperature sensor 40a has a failure or not by determining whether the failure of the boost converter 40 is caused by an overcurrent abnormality or the converter temperature Tc is equal to or higher than a reference value Tref in the failed state of the boost converter 40 (step S130). The overcurrent abnormality that overcurrent flows in the boost converter 40 is caused by an ON fixation of the transistor T32 that forms a lower arm of the boost converter 40. In this case, the overcurrent abnormality overheats the transistor T32 and results in damaging the transistor T32 and the temperature sensor 40a placed in the vicinity of the transistor T32. The transistor T32 is more likely to have a switching failure, and the temperature sensor 40a is more likely to continuously output a temperature value at the time when the temperature sensor 40a is damaged. Accordingly, when the failure of the boost converter 40 is caused by an overcurrent abnormality, it is determinable that the temperature sensor 40a has a failure. When the system is turned off and is subsequently turned on in the failed state of the boost converter 40, the failure of the boost converter 40 is stored but it may not be determinable whether the failure is caused by an overcurrent abnormality. In this case, the boost converter 40 is stopped (gate blocked) by the occurrence of a failure, so that the temperature of the boost converter 40 is expected to be relatively low. Accordingly, when the converter temperature Tc input from the temperature sensor 40a is equal to or higher than the reference value Tref irrespective of the failed state of the boost converter 40, it is determinable that the temperature sensor 40a has a failure. The reference value Tref is a relatively high temperature in an operation temperature range of the boost converter 40, and is determined in advance as a lower limit temperature to impose a limit on the discharge power upper limit value Woutlim of the battery 36.

When it is determined that the temperature sensor 40a has a failure at step S130, the CPU 52 sets a temperature Tset determined in advance as an ordinary operation temperature of the boost converter 40 to a criterion temperature Tcj (step S140). When it is determined that the temperature sensor 40a does not have a failure at step S130, on the other hand, the CPU 52 sets the converter temperature Tc input from the temperature sensor 40a to the criterion temperature Tcj (step S150).

The CPU 52 subsequently compares the criterion temperature Tcj with the reference value Tref (step S160). When the criterion temperature Tcj is equal to or higher than the reference value Tref, the CPU 52 sets a predetermined value in a range of value 0 to value 1 to the limiting factor kout such that the higher criterion temperature Tcj provides the smaller limiting factor kout (step S170). When the criterion temperature Tcj is lower than the reference value Tref, on the other hand, the CPU 52 sets a value 1 to the limiting factor kout (step S180). The CPU 52 then sets the discharge power upper limit value Woutlim by multiplying the output limit Wout of the battery 36 by the limiting factor kout (step S190) and terminates this routine.

Figure 3:
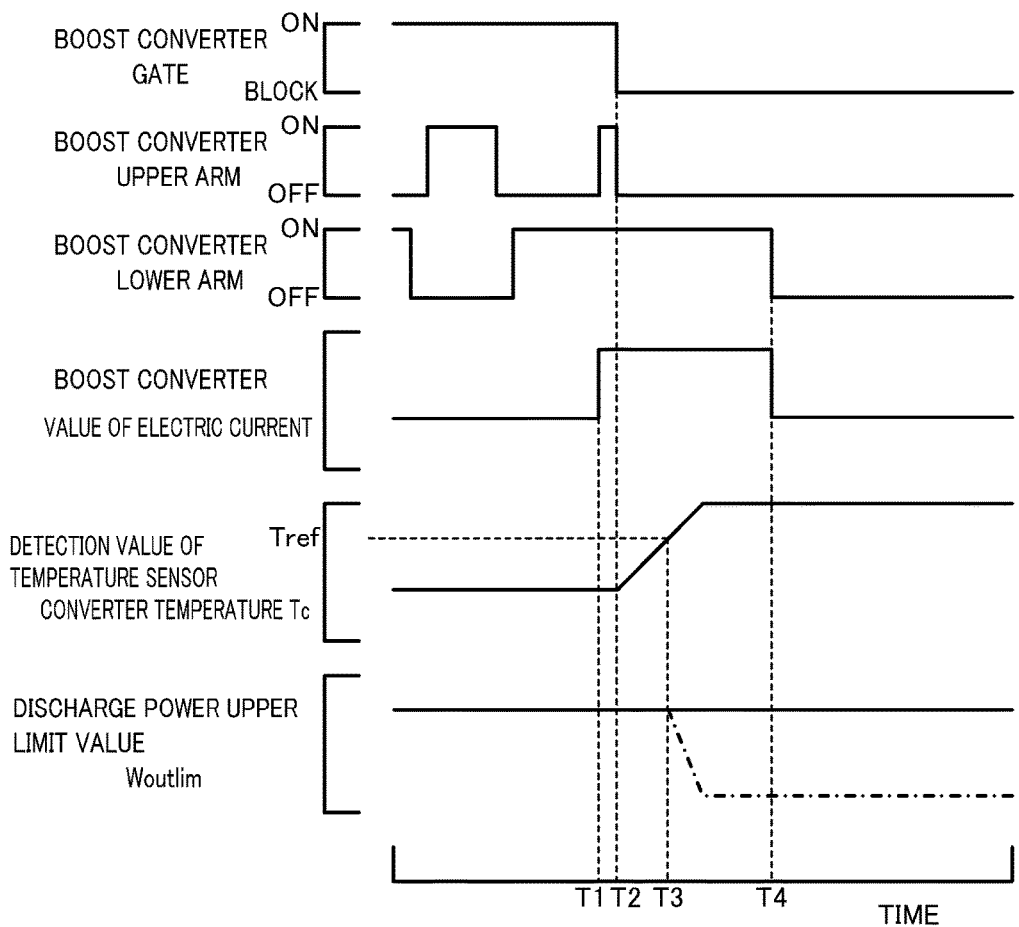
FIG. 3 is a diagram illustrating one example of time changes in conditions of a boost converter, a detection value of a temperature sensor and the like at the time of an ON fixation of a transistor T32 in a lower arm of the boost converter.

FIG. 3 is a diagram illustrating one example of time changes in, for example, the conditions of the boost converter 40 and the detection value of the temperature sensor 40a at the time of an ON fixation of the transistor T32 in the lower arm of the boost converter 40. From the top to the bottom, FIG. 3 shows the gate state of the boost converter 40, the on-off state of the transistor T31 in an upper arm of the boost converter 40, the on-off state of the transistor T32 in the lower arm of the boost converter 40, the value of electric current flowing in the boost converter 40, the detection value of the temperature sensor 40a (converter temperature Tc) and the discharge power output limit value Woutlim. A one-dot chain line curve in the discharge power output limit value Woutlim of FIG. 3 shows a comparative example. The comparative example imposes a limit on the discharge power upper limit value Woutlim, based on the converter temperature Tc input from the temperature sensor 40a. On the occurrence of an ON fixation abnormality of the transistor T32 in the lower arm of the boost converter 40 at a time T1, overcurrent flows in the boost converter 40. In response to detection of the overcurrent, the boost converter 40 is stopped (gate blocked) at a time T2. The transistor T32 is, however, in the state of ON fixation, and overcurrent continuously flows in the boost converter 40. This overheats the transistor T32. At a time T4, the transistor T32 and the temperature sensor 40a are damaged. The transistor T32 is accordingly turned off, and the temperature sensor 40a continuously outputs a temperature value at the time when the temperature 40a is damaged. In response to an increase in converter temperature Tc input from the temperature sensor 40a, the comparative example starts imposing a limit on the discharge power upper limit value Woutlim at a time T3. This significantly limits the discharge power upper limit value Woutlim, prior to the time T4 when the transistor T32 and the temperature sensor 40a are damaged. This results in significantly limiting the discharge power from the battery 36 and significantly limiting the torque of the motor 32. The embodiment, on the other hand, determines that a failure of the boost converter 40 is caused by an overcurrent abnormality and causes a failure of the temperature sensor 40a, and sets the temperature Tset as the ordinary operation temperature of the boost converter 40 to the criterion temperature Tcj. This does not impose a limit on the discharge power upper limit value Woutlim even after the time T3. This results in not limiting the discharge power from the battery 36 and not limiting the torque of the motor 32.

On the occurrence of a failure in the boost converter 40, the drive system mounted on the electric vehicle 20 of the embodiment described above stops the boost converter 40 (gate blocking) and supplies the voltage of the battery 36 to the inverter 34 so as to drive the motor 32. The drive system subsequently determines whether the temperature sensor 40a has a failure or not by determining whether a failure of the boost converter 40 is caused by an overcurrent abnormality or the converter temperature Tc is equal to or higher than the reference value Tref in the failed state of the boost converter 40. When it is determined that the temperature sensor 40a has a failure, the drive system sets the temperature Tset as the ordinary operation temperature of the boost converter 40 to the criterion temperature Tcj. This does not impose a limit on the discharge power upper limit value Woutlim. This results in not limiting the discharge power from the battery 36 and not limiting the torque of the motor 32. As a result, the drive system can drive the motor 32 as needed even on the occurrence of a failure of the boost converter 40.

The electric vehicle 20 of the embodiment uses the battery 36 as the power storage device. The power storage device may, however, be any device that is allowed to store electric power therein, for example, a capacitor.

The embodiment describes the configuration of the drive system mounted on the electric vehicle 20. As long as the drive system is equipped with the motor, the inverter, the power storage device and the boost converter, the drive system may be configured to be mounted on a hybrid vehicle or may be configured to be mounted on stationary equipment such as construction equipment.

In the drive system of the above aspect, the control device may determine that the temperature sensor has a failure, when the failure of the boost converter is caused by an overcurrent abnormality that overcurrent flows in the boost converter. An overcurrent abnormality that overcurrent flows in the boost converter is likely to overheat the boost converter and damage the temperature sensor.

In the drive system of the above aspect, the control device may determine that the temperature sensor has a failure, when the boost converter has a failure and the temperature detected by the temperature sensor is equal to or higher than the predetermined temperature. This configuration enables the motor to be driven as needed on a subsequent driving start.

The following describes the correspondence relationship between the primary components of the embodiment and the primary components of the disclosure described in Summary. The motor 32 of the embodiment corresponds to the "motor"; the inverter 34 corresponds to the "inverter"; the battery 36 corresponds to the "power storage device"; the boost converter 40 corresponds to the "boost converter"; the temperature sensor 40s corresponds to the "temperature sensor"; and the electronic control unit 50 corresponds to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The disclosure is applicable to, for example, the manufacturing industries of drive systems.

The invention claimed is:
1. A drive system, comprising:
a motor;
an inverter configured to drive the motor;
a power storage device;
a boost converter configured to step up an electric power on a power storage device side and supply the stepped-up electric power to an inverter side;
a temperature sensor configured to detect a temperature of the boost converter; and
a control device configured to, when the temperature detected by the temperature sensor is lower than a predetermined temperature, control the boost converter and the inverter, such that the motor is driven in a range of a discharge power upper limit value according to a state of the power storage device, and when the temperature detected by the temperature sensor is equal to or higher than the predetermined temperature, control the boost converter and the inverter, such that the motor is driven in a range of an electric power on which a limit is imposed to decrease the discharge power upper limit value, wherein
when a failure occurs in the boost converter, the control device controls the boost converter and the inverter, such that the motor is driven at a stop of the boost converter, and
when it is subsequently determined that the failure of the boost converter causes a failure of the temperature sensor, the control device controls the inverter, such that the motor is driven without a limit imposed on the discharge power upper limit value, irrespective of the temperature detected by the temperature sensor that is equal to or higher than the predetermined temperature.
2. The drive system according to claim 1,
wherein the control device determines that the temperature sensor has a failure, when the failure of the boost converter is caused by an overcurrent abnormality that overcurrent flows in the boost converter.
3. The drive system according to claim 1,
wherein the control device determines that the temperature sensor has a failure, when the boost converter has a failure and the temperature detected by the temperature sensor is equal to or higher than the predetermined temperature.

* * * * *